UNITED STATES PATENT OFFICE.

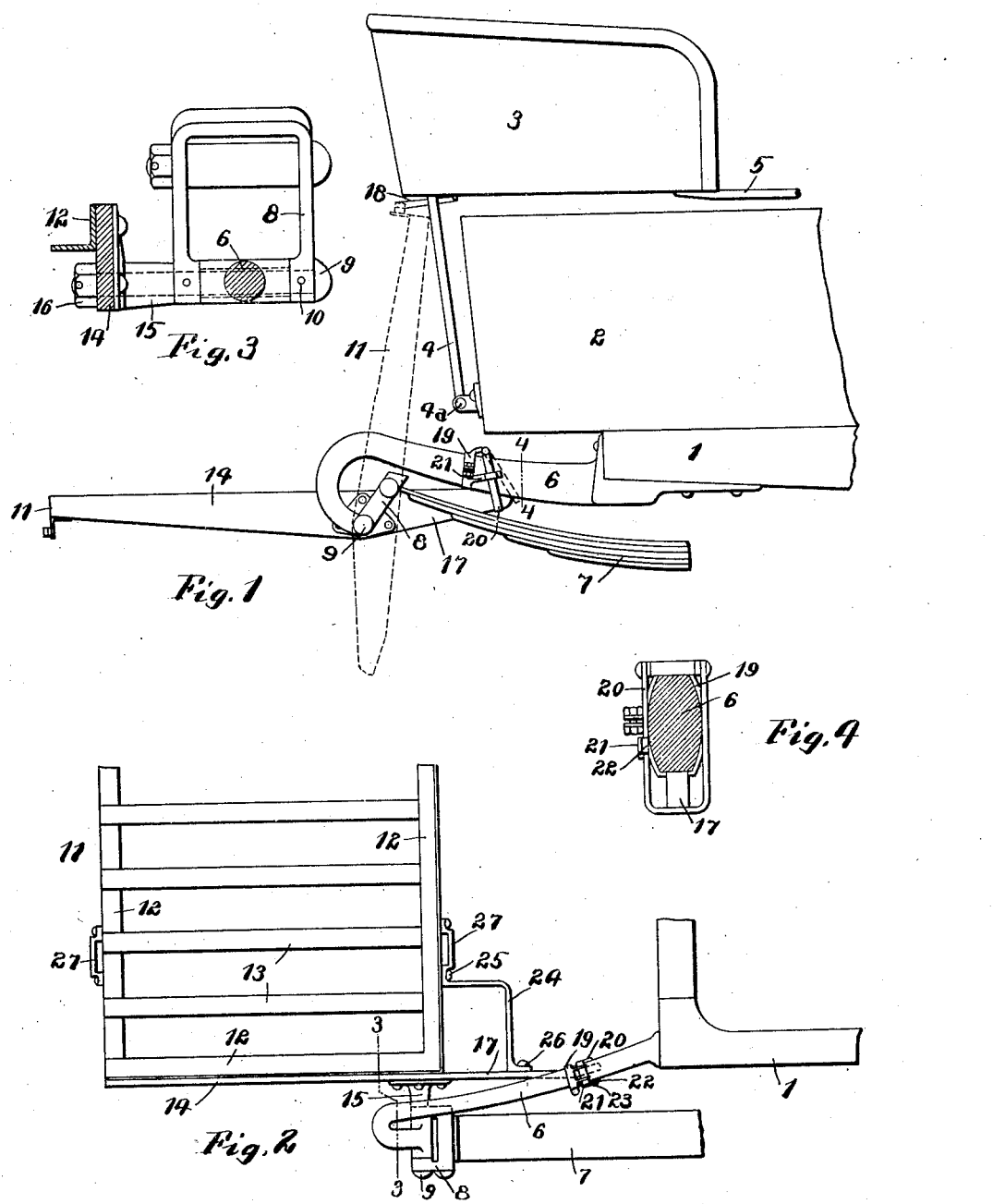

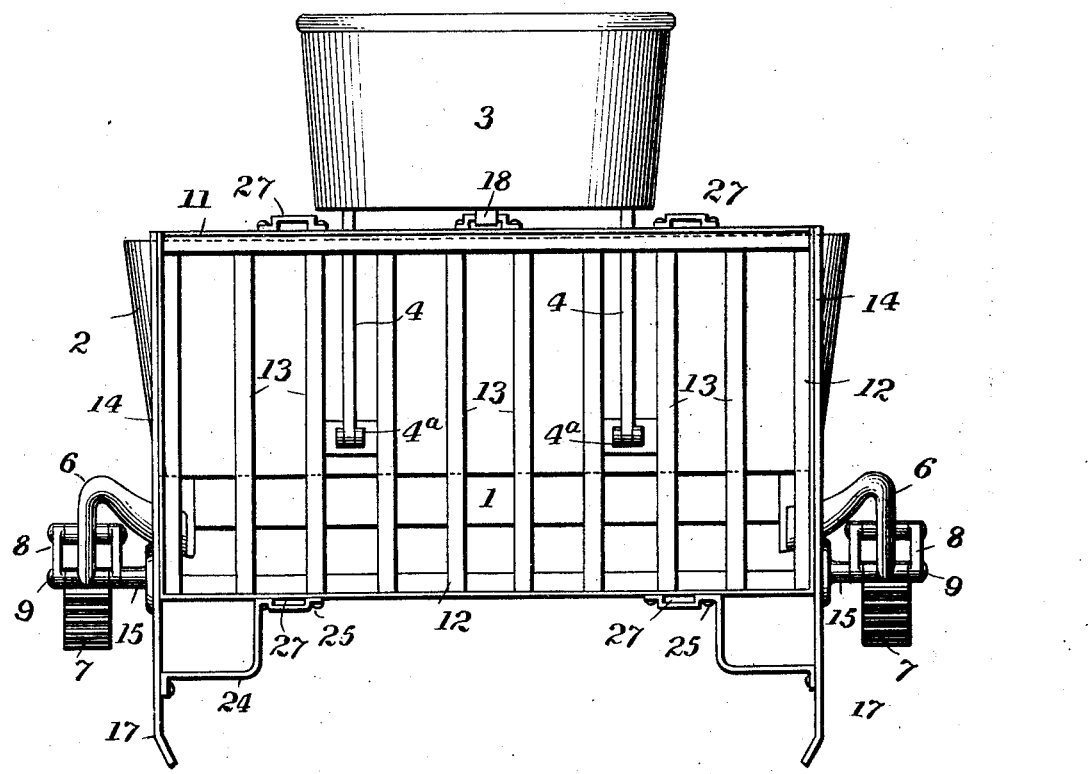

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

BAGGAGE-RACK FOR MOTOR-VEHICLES.

1,115,698. Specification of Letters Patent. Patented Nov. 3, 1914.

Application filed September 15, 1908. Serial No. 453,132.

*To all whom it may concern:*

Be it known that I, ALLEN LOOMIS, a citizen of the United States, and residing at Detroit, in the county of Wayne and State of Michigan, have invented certain new and useful Improvements in Baggage-Racks for Motor-Vehicles, of which the following is a specification.

This invention relates to motor vehicles and particularly to baggage racks adapted to be attached to the rear portion of such vehicles.

This baggage rack is particularly designed for vehicles in which the rear hanger of the rear spring extends rearwardly from the vehicle frame and wherein the body or some of its attachments extend somewhat beyond and overhang the rear of the frame. Heretofore it has been customary to connect baggage racks with the rear cross bar of the frame, as in U. S. Patent No. 890,654, and in some instances the rack is adapted to be elevated and rest against the rear portion of the body or its attachments, as in said patent. A rack thus connected is impractical on the style of vehicle above referred to because of the overhanging of the body. Therefore, the present invention has been designed to fill the requirements, but it will be understood that it is not limited to use with a vehicle of the above described type, some of its novel features being adapted to use with other vehicle constructions. The objects and advantages of the invention will be apparent from the following description taken in connection with the drawings.

In the accompanying drawings: Figure 1 is a side elevation of the rear portion of a motor vehicle embodying the invention, the baggage rack being shown in full lines in lowered position and in dotted lines in raised position; Fig. 2 is a plan view of one end of the baggage rack and the contiguous parts of the vehicle, the rack being in lowered position; Fig. 3 is a section on the line 3—3 of Fig. 2; Fig. 4 is a section on the line 4—4 of Fig. 1; and Fig. 5 is a rear view showing the baggage rack elevated.

Referring to the drawings, 1 represents the rear portion of the vehicle frame; 2 the body supported thereon, and 3 what is termed a "tiger" seat having the two rear legs 4 pivotally mounted at 4ª on the rear end of the body and the forward leg 5 adapted to extend forwardly to a detachable connection (not shown) with the body, whereby the seat may be tilted back on the pivots 4 for more convenient access to the interior of the body 2. The detail construction of this seat does not form a part of the present invention and is not claimed herein.

Extending rearwardly from the corners of the frame 1 are the two spring hangers 6, one of which is shown in Figs. 1 and 2, and as these hangers and the parts connected therewith are the same on both sides of the vehicle, only one of them will be herein described.

The hanger 6 is suitably curved and is connected with the rear end of the spring 7 through the shackle 8 and bolt 9, said bolt passing through the shackle and the end of the spring hanger as shown particularly in Fig. 3, preferably being keyed to the shackle by pins 10 to provide a long bearing in the hanger.

The body of the baggage rack 11 herein shown is of ordinary construction, being composed of angle iron side and end pieces 12 and spaced straps 13, all of which are riveted together to form a rigid frame suitable for supporting a trunk or other baggage. To each end angle iron 12 is secured an end piece 14 preferably of heavier stock than the body of the rack, as these pieces are required to bear the entire load placed upon the rack. Each of these end pieces 14 extends beyond one side of the rack and between its ends it has riveted to it a hinge piece 15 through which passes the end of the bolt 9 which is elongated for this purpose, and which is provided with a nut 16 to hold the parts in place. The extended end 17 of the end piece 14 above referred to is adapted to engage the under side of the spring hanger 6 and thus hold the rack in correct horizontal position.

It will be understoood that the pivotal connection of the rack with the end of the spring hanger permits the rack to be raised to the position shown in dotted lines in Fig. 1 and it may then be secured in this position by a strap 18 attached to the bottom of the seat 3. Means also are provided for detachably securing the extension 17 to the spring hanger 6 to hold the rack in its lowered position, this means comprising the band 19 clamped around the hanger 6, the stirrup 20 pivoted to said band and adapted to swing under the end of the extension 17 as will be seen by reference to Figs. 1 and 4, and the spring clip 21 which is shown as an integral arm on the band 19 and is formed with a beveled portion 22 and a notch 23 so that it will readily slip over and hold the stirrup 20 in the position shown in full lines in Fig. 1. It will be understood that when the stirrup 20 is released and moved to the position shown in dotted lines in Fig. 1, the extension 17 is thereby released and the rack may be turned on the bolt 9 to its raised position.

In a vehicle of the type described above in which there is a tiger seat at the rear, it is desirable that a convenient step be provided to gain access to the seat. In the present invention this step is formed as a part of the baggage rack and comprises an "L" shaped strip 24 having one end riveted to the side of the rack at 25 and the other end riveted to the extension 17 at 26. It will be seen that when the rack is in its raised position this step will hang just below the level of the bolt 9 and thus be available in ascending to the seat 3. In the drawings the strip 24 forming the step is shown as an integral part of one of the loops 27 to which straps are secured for holding the baggage on the rack, but it will be understood that the step may be formed in any other suitable way without departing from the spirit of the invention. Also in the form shown the strip 24 acts as a brace to strengthen the extension 17 thus performing a double function.

Having thus described the invention, what is claimed is:

1. In a motor vehicle, the combination with the frame and a baggage rack pivoted thereto, of a step mounted on said baggage rack and adapted to be brought into available position when said baggage rack is raised.

2. In a motor vehicle, the combination with the rear spring hanger, the spring shackle, and the bolt passing through the hanger and shackle, of a baggage rack pivoted on said bolt and having a part normally in engagement with said hanger between the ends of the latter.

3. In a motor vehicle, the combination with the spring hanger and a baggage rack pivoted thereto, the said rack being provided with an extension beyond said pivot, of means for separably holding said baggage rack in open position, comprising a band clamped on said hanger, a stirrup pivoted to said band and adapted to pass over the end of an extension on said baggage rack, and a spring clip on said band adapted to engage and hold said stirrup.

In testimony whereof I affix my signature in presence of two witnesses.

ALLEN LOOMIS.

Witnesses:
 CLARA I. DALE,
 HOWARD HARKNESS.